United States Patent
Yang

(10) Patent No.: US 12,432,305 B2
(45) Date of Patent: Sep. 30, 2025

(54) SYSTEM AND METHOD FOR CONTROLLING LABEL PRINTING

(71) Applicant: Seiko Instruments Inc., Chiba (JP)

(72) Inventor: Dong Yang, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 18/516,582

(22) Filed: Nov. 21, 2023

(65) Prior Publication Data

US 2024/0179249 A1 May 30, 2024

(30) Foreign Application Priority Data

Nov. 29, 2022 (JP) ................. 2022-189778

(51) Int. Cl.
*G06F 3/12* (2006.01)
*H04N 1/00* (2006.01)

(52) U.S. Cl.
CPC ..... *H04N 1/00331* (2013.01); *H04N 1/00015* (2013.01); *H04N 1/00376* (2013.01); *H04N 2201/0096* (2013.01)

(58) Field of Classification Search
CPC ........... H04N 1/00328; H04N 1/00331; H04N 1/00015; H04N 1/00376; H04N 2201/0096; G06K 15/024; G06K 2215/0097; G06F 3/1242; G06F 3/1243
USPC ....................................... 358/474
See application file for complete search history.

(56) References Cited

U.S. PATENT DOCUMENTS

| | | | | |
|---|---|---|---|---|
| 5,503,482 A | * | 4/1996 | Kawakami | B41J 3/4075 400/615.2 |
| 2005/0201796 A1 | * | 9/2005 | Arkin | B41J 3/4075 400/76 |
| 2007/0195337 A1 | * | 8/2007 | Takayama | G06K 15/02 358/1.15 |
| 2015/0331588 A1 | * | 11/2015 | Ishida | G06F 3/04812 715/765 |
| 2020/0042842 A1 | * | 2/2020 | Nakamura | G06K 15/1822 |
| 2020/0406633 A1 | * | 12/2020 | Yuasa | G06F 3/1208 |
| 2022/0382492 A1 | * | 12/2022 | Mizutani | G06F 3/1208 |

FOREIGN PATENT DOCUMENTS

| | | | | |
|---|---|---|---|---|
| JP | 2007038411 A | * | 2/2007 | ............ B41J 3/4075 |
| JP | 2007-118258 A | | 5/2007 | |
| JP | 2011-251484 A | | 12/2011 | |

OTHER PUBLICATIONS

Extended European Search Report in Europe Application No. 23212684.7, dated Apr. 23, 2024, 8 pages.

* cited by examiner

*Primary Examiner* — Kent Yip
(74) *Attorney, Agent, or Firm* — Crowell & Moring LLP

(57) ABSTRACT

A printing system includes a portable terminal including a thermal head; and a host device configured to control label printing performed by the portable terminal. The host device includes a label generation module configured to generate the new label by adjusting, based on information relating to an object included in existing label data and a size of a new label, one or both of a position and a size of the object in the new label.

12 Claims, 9 Drawing Sheets

| LABEL INFORMATION | CONSTITUENT ELEMENT INFORMATION |
|---|---|
| LABEL $\alpha 1$ | CONSTITUENT ELEMENT $\beta 1 - \beta 5$ |
| LABEL $\alpha 2$ | CONSTITUENT ELEMENT $\beta 11 - \beta 15$ |
| LABEL $\alpha 3$ | CONSTITUENT ELEMENT $\beta 21 - \beta 23$ |
| ⋮ | ⋮ |

//]:# SYSTEM AND METHOD FOR CONTROLLING LABEL PRINTING

RELATED APPLICATIONS

This application claims priority to Japanese Patent application No. JP2022-189778 filed on Nov. 29, 2022, the entire content of which is incorporated herein by reference.

BACKGROUND OF THE INVENTION

1. Field of the Invention

The present disclosure relates to a printing system, a host device, a printing control method, and a program.

2. Description of the Related Art

In a printing system, an image of label data including a plurality of objects is printed in some cases. In the image, the respective objects are arranged at corresponding positions.

For example, in a printing device as described in Japanese Patent Application Laid-open No. 2011-251484, a label having a format similar to that of a label created in the past is created. The format is character code information and attribute information such as a typeface of characters.

However, with the above-mentioned related art, when a label having a size different from that of a label created in the past is to be created, a workload on a user (operator) increases in some cases. Specifically, a label created in the past is created for each sheet, and hence, when the past label is used to create a label having a different size, the user is in some cases required to use a dedicated label creation tool (for example, a user interface) to adjust an arrangement position of each object so that each object fits the size of a sheet.

The present disclosure has been made in view of the above-mentioned circumstances, and has an object to provide a printing system, a host device, a printing control method, and a program with which, when a new label data is to be generated based on existing label data, an arrangement position of an object can be adjusted without an increase in workload on a user.

SUMMARY OF THE INVENTION

According to one embodiment of the present invention, there is provided a printing system including a portable terminal including a thermal head; and a host device configured to control label printing performed by the portable terminal, wherein the host device includes a label generation module configured to generate the new label by adjusting, based on information relating to an object included in existing label data and a size of a new label, one or both of a position and a size of the object in the new label.

In the above-mentioned thermal printer according to the one embodiment of the present invention, wherein the host device further includes an extraction module configured to extract the information on the object included in the existing label data.

In the above-mentioned thermal printer according to the one embodiment of the present invention, wherein the host device further includes an image conversion module configured to convert the information on the object into an image, and wherein the label generation module is configured to generate the new label through use of the image obtained by the conversion by the image conversion module.

In the above-mentioned thermal printer according to the one embodiment of the present invention, wherein the host device further includes an instruction processing module configured to receive input of an instruction including the size of the new label.

In the above-mentioned thermal printer according to the one embodiment of the present invention, wherein the label generation module of the host device is configured to adjust, based on relative positions of two or more objects included in the existing label data, relative positions of the two or more objects in the new label.

In the above-mentioned thermal printer according to the one embodiment of the present invention, wherein the label generation module of the host device is configured to adjust, based on a ratio between predetermined values regarding a size of a label of the existing label data and the size of the new label, sizes of one or more objects in the new label.

In the above-mentioned thermal printer according to the one embodiment of the present invention, wherein the label generation module of the host device is configured to generate the new label in which two or more objects are prevented from overlapping with each other by adjusting one or both of a position and a size of each of one or more objects in the new label.

In the above-mentioned thermal printer according to the one embodiment of the present invention, wherein the label generation module of the host device is configured to adjust one or both of a position and a size of each of one or more objects among two or more objects overlapping with each other, to thereby prevent the two or more objects from overlapping with each other.

In the above-mentioned thermal printer according to the one embodiment of the present invention, wherein the label generation module of the host device is configured to adjust one or both of a position and a size for each of all objects in the new label.

In the above-mentioned thermal printer according to the one embodiment of the present invention, wherein the label generation module of the host device is configured to make, when the object is a two-dimensional code, an aspect ratio of the object in the existing label data and an aspect ratio of the object in the new label the same.

According to one embodiment of the present invention, there is provided a host device for controlling label printing performed by a portable terminal including a thermal head, the host device including a label generation module configured to generate the new label by adjusting, based on information relating to an object included in existing label data and a size of a new label, one or both of a position and a size of the object in the new label.

According to one embodiment of the present invention, there is provided a printing control method of controlling label printing performed by a portable terminal including a thermal head, the printing control method including generating the new label by adjusting, based on information relating to an object included in existing label data and a size of a new label, one or both of a position and a size of the object in the new label.

According to one embodiment of the present invention, there is provided a program for causing a computer for controlling label printing performed by a portable terminal including a thermal head to implement the functions of acquiring information relating to an object included in existing label data; acquiring a size of a new label, and generating the new label by adjusting, based on the acquired information relating to the object and the acquired size of the new label, one or both of a position and a size of the object in the new label.

DETAILED DESCRIPTION OF THE PREFERRED EMBODIMENTS

Figure 1:
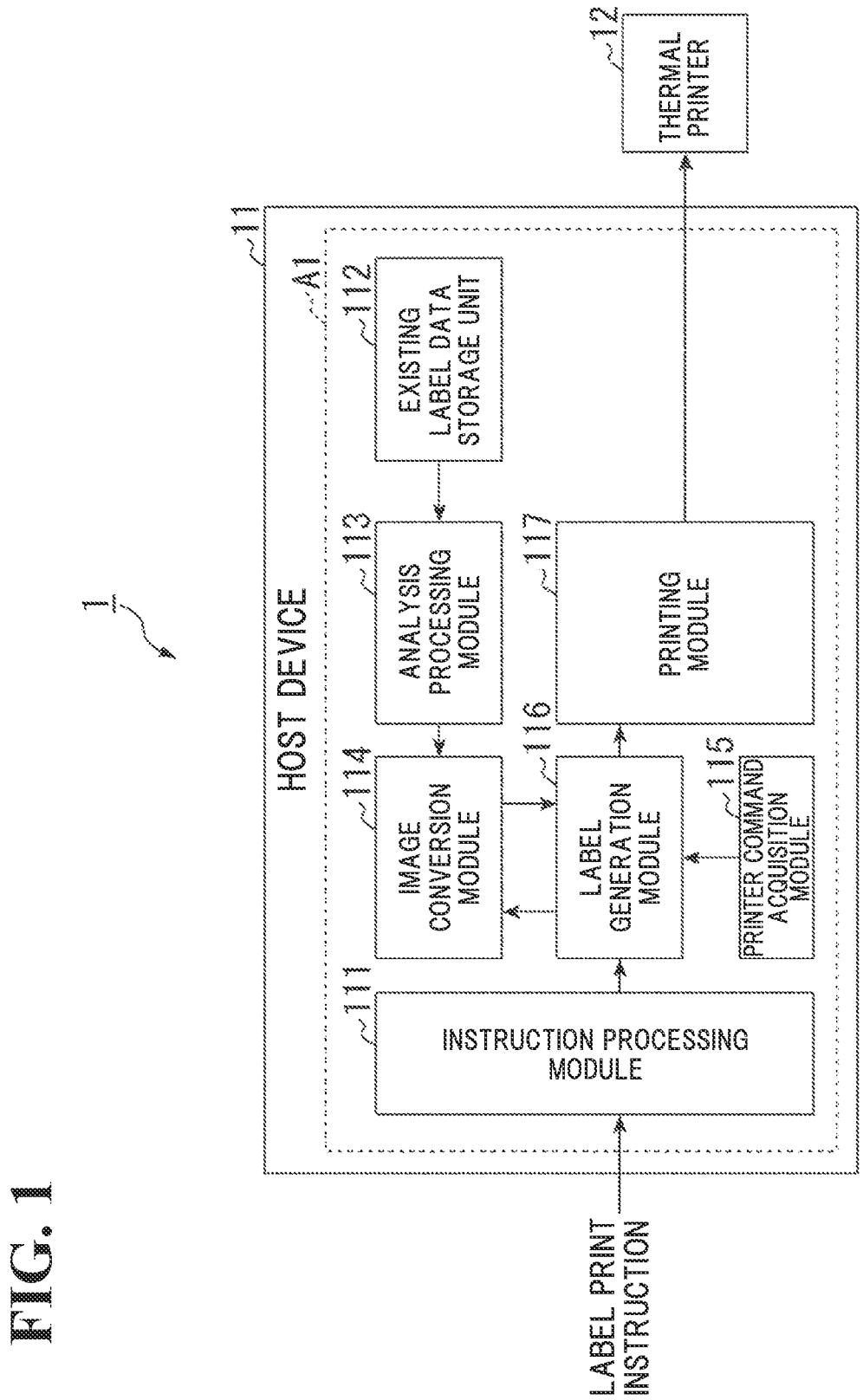
FIG. 1 is a diagram for illustrating one example of a functional configuration of a host device of a printing system according to at least one embodiment of the present disclosure.

Now, referring to the drawings, at least one embodiment of the present disclosure is described.
[Printing System]

FIG. 1 is a diagram for illustrating one example of a functional configuration of a host device 11 of a printing system 1 according to the at least one embodiment. The printing system 1 includes the host device 11 and a thermal printer 12. The host device 11 and the thermal printer 12 are connected to each other for communication in a wired or wireless manner. In the at least one embodiment, the thermal printer 12 is a portable terminal including a thermal head.

As the wired communication, for example, communication using Universal Serial Bus (USB) may be used. As the wireless communication, for example, communication using Wi-Fi or communication using Bluetooth (trademark) may be used.
<Host Device>

The host device 11 is a computer, for example, a notebook computer, a laptop computer, a smartphone, or a tablet terminal.

In FIG. 1, one example of a functional block A1 of the host device 11 is illustrated. The host device 11 includes an instruction processing module 111, an existing label data storage unit 112, an analysis processing module 113, an image conversion module 114, a printer command acquisition module 115, a label generation module 116, and a printing module 117.

In the at least one embodiment, the host device 11 includes a processor such as a central processing unit (CPU) and a memory such as a read-only memory (ROM) and a random access memory (RAM). In the host device 11, the processor executes a predetermined program, to thereby execute processing of the instruction processing module 111, the analysis processing module 113, the image conversion module 114, the printer command acquisition module 115, the label generation module 116, and the printing module 117. The program may be stored in the memory. The program may be, for example, a printer driver. In the host device 11, the existing label data storage unit 112 is formed by the memory.

The instruction processing module 111 receives input of a label print instruction to process the instruction. In the at least one embodiment, the instruction processing module 111 outputs the instruction to the label generation module 116. In the at least one embodiment, the label print instruction includes information (label ID) with which a label is identified. The host device 11 stores a table (label size table) in which, for one or more label IDs, each of the label IDs and the size of a label are associated with each other. In the host device 11, for example, the instruction processing module 111 identifies the size of a label corresponding to the label ID included in the label print instruction, and outputs the identified size of the label to the label generation module 116. The instruction input from the instruction processing module 111 to the label generation module 116 may include an instruction for another item.

The label print instruction may be, for example, input to the host device 11 through an operation of the user, or may be automatically input to the host device 11 based on information that is set in advance. The user may use, for example, any application programming interface (API) to input the label print instruction to the host device 11.

In the at least one embodiment, the case in which the label size table is stored in the host device 11 has been described, but as another example, the label size table may be stored in another device, and the host device 11 may acquire the label size table from the another device to refer to the label size table. In the at least one embodiment, the case in which the label size table is used has been described, but as another example, the label print instruction may include information specifying the size of a label, and in this case, the label size table is not required to be stored in the host device 11.

The existing label data storage unit 112 stores existing label data. Any label data may be used as the existing label data, and for example, label data created in advance by the user may be used. As the existing label data, one piece of label data may be used, or a plurality of pieces of label data may be stored, and one piece of label data may be selected from among the plurality of pieces of label data. In the at least one embodiment, the existing label data is saved in the functional block A1 of the host device 11, but may be saved outside the functional block A1, for example, in a hard disk drive of the host device 11. In this case, for example, the user saves a file of label data that has been created through use of another tool at any position of the hard disk drive of the host device 11.

In the at least one embodiment, each piece of label data is binary data, and includes data on one or more objects. The object may be referred to as, for example, "constituent element." Each piece of label data includes information specifying a position and a size of each of the objects included in the label data. Each piece of label data may also include information specifying the type of each of the objects included in the label data. In the at least one embodiment, each piece of label data is formed in a predefined format, and based on each piece of label data, information on each object included in the label data can be extracted.

Examples of the type of each object may include a character, an image, a one-dimensional code, and a two-dimensional code. The position of each object may be expressed through use of, for example, coordinates, or may be expressed through use of, a reference such as a top, a bottom, a left, and a right of a printing region. When the position is expressed through use of the reference such as the top, the bottom, the left, or the right of the printing region, for example, a mode in which an object is arranged at the top, the bottom, the left, or the right of the printing region or a mode in which an object is arranged to be separated from the top, the bottom, the left, or the right of the printing region by a predetermined distance may be used. The size of each object may be expressed through use of, for example, a numerical value, or may be expressed through use of a range occupied by the object.

The analysis processing module 113 reads the label data stored in the existing label data storage unit 112 and performs processing of analyzing the read label data. The analysis processing module 113 reads, for example, one piece of label data. The label data to be read may be, for example, set in advance, or may be designated by the user or the like from among the plurality of pieces of label data. The designation may be included in, for example, the label print instruction. As the processing of analyzing the label data, processing of extracting information on each object included in the label data is performed. The analysis processing module 113 also has a function serving as an extraction module which extracts the information. The analysis processing module 113 outputs data on each object that has been extracted to the image conversion module 114.

The image conversion module 114 converts the data on each object input from the analysis processing module 113 into an image of the object. The image conversion module 114 outputs the image of each object obtained by the conversion to the label generation module 116.

When there are a plurality of objects, for example, the image conversion module 114 may convert all of the plurality of objects into images, or may convert some of the plurality of objects into images.

The printer command acquisition module 115 acquires a printer command and outputs the acquired printer command to the label generation module 116. The printer command is, for example, a command for performing printing.

The label generation module 116 generates label data based on the label print instruction from the instruction processing module 111, the image of each object from the image conversion module 114, and the printer command from the printer command acquisition module 115. The label generation module 116 outputs the generated label data to the printing module 117.

The label generation module 116 adjusts, for example, the position and the size of each object to generate an image of one piece of label data as a whole. In the at least one embodiment, the label generation module 116 can give an instruction regarding processing for conversion into an image to the image conversion module 114, but is not always required to have a function of giving the instruction.

The printing module 117 outputs to the thermal printer 12 print data for printing the image of the label data input from the label generation module 116.

In the at least one embodiment, the case in which the existing label data is stored inside the host device 11 has been described, but as another example, a configuration in which the existing label data is stored in another device and the host device 11 acquires the existing label data from the another device may be used. In this case, the existing label data may be stored in, for example, an external file. The another device may be, for example, an external server. In the at least one embodiment, in the host device 11, a user interface (UI) screen is not used in the generation of the label data.

In the example of FIG. 1, the configuration example in which the host device 11 includes the analysis processing module 113 has been described, but as another example, a configuration in which the host device 11 does not have the function of the analysis processing module 113 and the function of the analysis processing module 113 is implemented by an external device may be used. In the example of FIG. 1, the configuration example in which the host device 11 includes the image conversion module 114 has been described, but as another example, a configuration in which the host device 11 does not have the function of the image conversion module 114 and the function of the image conversion module 114 is implemented by an external device may be used. For example, the processing for conversion into an image by the image conversion module 114 is not required to be performed, and in this case, the host device 11 is not required to have the function of the image conversion module 114.

<Thermal Printer>

Figure 2:
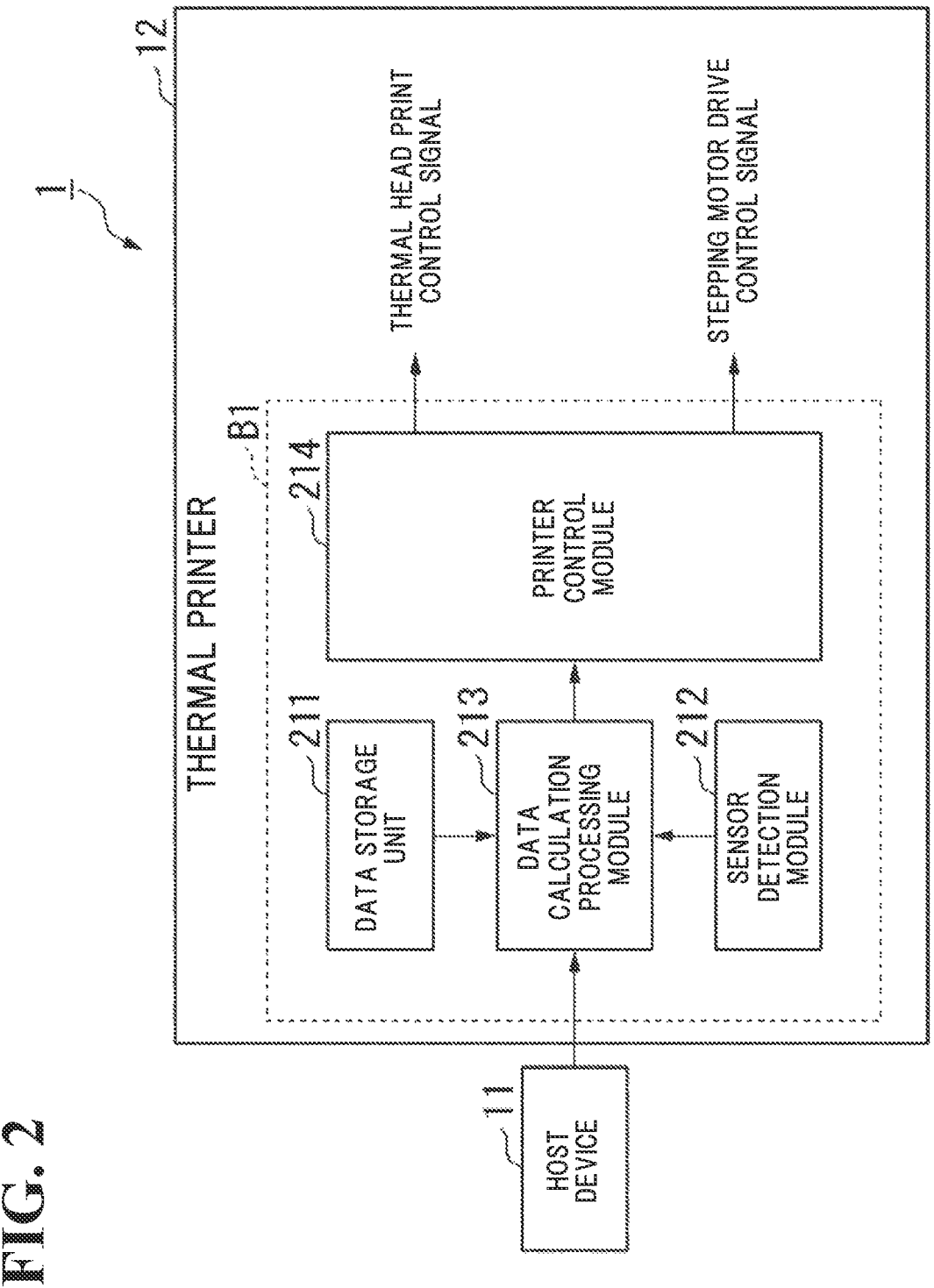
FIG. 2 is a diagram for illustrating one example of a functional configuration of a thermal printer of the printing system according to the at least one embodiment.

FIG. 2 is a diagram for illustrating one example of a functional configuration of the thermal printer 12 of the printing system according to the at least one embodiment. In FIG. 2, one example of a functional block B1 of the thermal printer 12 is illustrated.

The thermal printer 12 includes a data storage unit 211, a sensor detection module 212, a data calculation processing module 213, and a printer control module 214.

In the at least one embodiment, the thermal printer 12 includes a processor such as a CPU and a memory such as a ROM and a RAM. In the thermal printer 12, the processor executes a predetermined program, to thereby execute processing of the sensor detection module 212, the data calculation processing module 213, and the printer control module 214. The program may be stored in the memory. In the thermal printer 12, the data storage unit 211 is formed by the memory.

The data storage unit 211 stores predetermined data. The data storage unit 211 outputs the data to the data calculation processing module 213. In the at least one embodiment, the data is, for example, data such as a parameter to be used in printing, but it is not always required to use such data.

The sensor detection module 212 acquires a detection value obtained by a sensor included in the printer, and outputs the acquired detection value to the data calculation processing module 213. Examples of the sensor include a sensor which detects presence or absence of a sheet.

The data calculation processing module 213 receives input of the print data from the host device 11. The data calculation processing module 213 performs predetermined calculation processing based on the print data from the host device 11, the data from the data storage unit 211, and the detection value from the sensor detection module 212 to acquire a printing control signal for printing the print data.

The data calculation processing module 213 outputs the acquired printing control signal to the printer control module 214.

The printer control module 214 controls a thermal head (not shown) and a stepping motor (not shown) based on the printing control signal input from the data calculation processing module 213. In the at least one embodiment, the printer control module 214 outputs a thermal head print control signal to the thermal head, and the printer control module 214 outputs a stepping motor drive control signal to the stepping motor.

<Label Information Table>

Figures 3, 4:
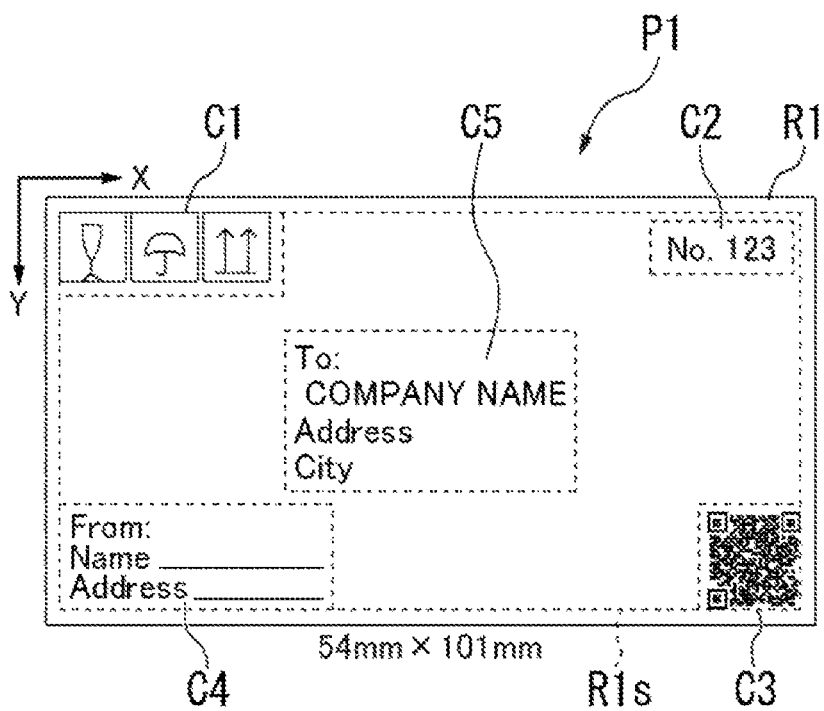
FIG. 3 is a table for showing one example of a label information table in the at least one embodiment.
FIG. 4 is a diagram for illustrating one example of existing label data in the at least one embodiment.

FIG. 3 is a table for showing one example of a label information table 2011 in the at least one embodiment. The label information table 2011 stores information (label information) relating to the label data and constituent element information on the label data in association with each other. For example, the label ID may be used as the label information. For example, the information on the object included in the label data may be used as the constituent element information.

In the example of FIG. 3, in the label information table 2011, the fact that a label α1 includes five constituent elements β1 to β5 is stored. Information on each of the constituent elements β1 to β5 may also be stored. Similarly, in the example of FIG. 3, in the label information table 2011, the fact that a label α2 includes five constituent elements β11 to β15 and the fact that a label α3 includes three constituent elements β21 to β23 are stored.

In the host device 11, for example, a result of the analysis processing executed by the analysis processing module 113 may be managed by the label information table 2011. It is not always required to use such a label information table 2011. For example, the following configuration may be adopted. Specifically, without use of the label information table 2011, every time the user is to print a label, the user designates a file of label data saved in advance in the hard disk drive or the like, and thus new label data is generated based on data on the file to print a new label. In this case, in place of the labels α1, α2, α3, ... of the above-mentioned label information table 2011, for example, one or more files such as a label (1) file, a label (2) file, a label (3) file, ... are saved in a storage area such as the hard disk drive of the host device 11, and the user designates one file from among those files, and thus layout or the like is executed again on the file to generate a new label.

[Examples of Generating New Label Data from Existing Label Data]

Referring to FIG. 4 to FIG. 13, examples of generating the new label data from the existing label data are described. In each of FIG. 4 to FIG. 13, for the convenience of description, an XY orthogonal coordinate system, which is a two-dimensional orthogonal coordinate system, is illustrated. In the at least one embodiment, an origin of coordinates is set at a predetermined corner of a sheet (in the illustrated examples, an upper-left corner), an X axis is set in one direction (in the illustrated examples, a rightward direction), and a Y axis is set in another direction orthogonal to the one direction (in the illustrated examples, a downward direction). In the examples of FIG. 4 to FIG. 13, for the convenience of description, a virtual frame (rectangular frame) surrounding content of an object is illustrated, but the frame is not displayed in actual cases.

[One Example of Existing Label Data]

FIG. 4 is a diagram for illustrating one example of existing label data P1 in the at least one embodiment. In the example of FIG. 4, the size of the existing label data P1 is 54 mm in length×101 mm in width. The existing label data P1 includes information for arranging five objects C1 to C5 at predetermined positions in a printing region R1s set inside a region of a sheet (sheet region R1).

In the example of FIG. 4, the object C1 is an object of pictorial symbols (images), and is set to be arranged at a position of an upper-left end of the printing region R1s. The object C2 is an object of characters (including numbers), and is set to be arranged at a position separated by a predetermined distance from an upper-right end of the printing region R1s. The object C3 is an object of a two-dimensional code, and is set to be arranged at a position of a lower-right end of the printing region R1s. The object C4 is an object of characters (including underlines), and is set to be arranged at a position of a lower-left end of the printing region R1s. The object C5 is an object of characters, and is set to be arranged at a position of a center of the printing region R1s.

In the at least one embodiment, each of the objects C1 to C5 is treated as an image.

[Examples of New Label Data]

Referring to FIG. 5 to FIG. 9, examples of the new label data generated based on the existing label data P1 are described.

The label generation module 116 generates new label data as a whole by adjusting, for each of the five objects C1 to C5 included in the existing label data P1, the position and the size thereof to arrange the object. As the adjustment processing, for each of the objects C1 to C5, one of the position and the size thereof may be changed, both thereof may be changed, or such a change in position or size may not be made.

Figure 5:
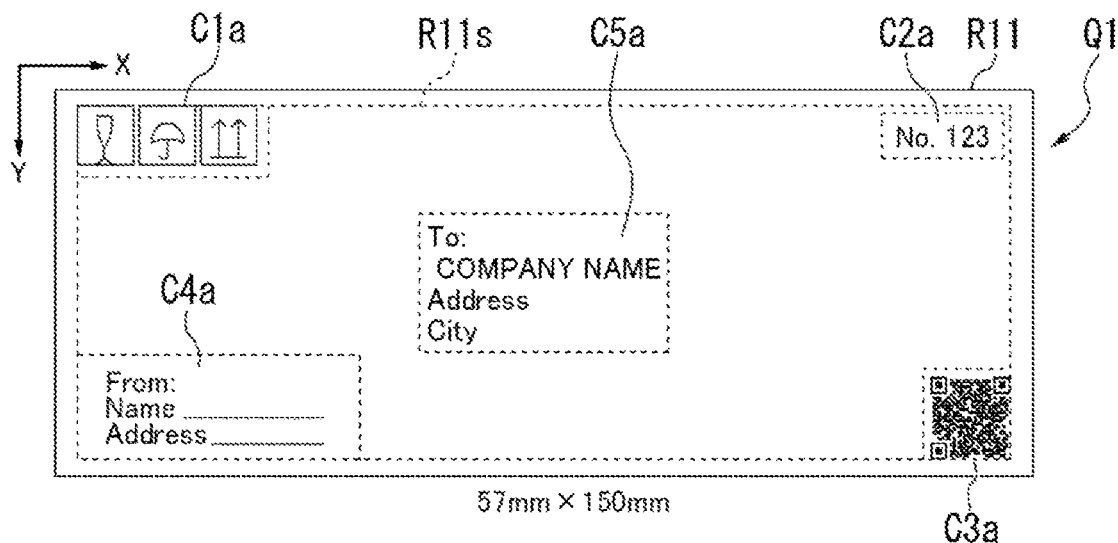
FIG. 5 is a diagram for illustrating one example of new label data in the at least one embodiment.

FIG. 5 is a diagram for illustrating one example of new label data Q1 in the at least one embodiment. The size of a sheet of the new label data Q1 differs from the size of the sheet of the existing label data P1, and is designated by the label print instruction. In the example of FIG. 5, the size of the new label data Q1 is 57 mm in length×160 mm in width.

A result of adjustment relating to the example of FIG. 5 is described. The new label data Q1 includes information for arranging five objects C1a to C5a at predetermined positions in a printing region R11s set inside a region of the sheet (sheet region R11). The objects C1a to C5a correspond to the objects C to C5 in the existing label data P1, respectively.

In the example of FIG. 5, the object C1a is set to be arranged at a position of an upper-left end of the printing region R11s. The object C2a is set to be arranged at a position separated by a predetermined distance from an upper-right end of the printing region R11s. The object C3a is set to be arranged at a position of a lower-right end of the printing region R11s. The object C4a is set to be arranged at a position of a lower-left end of the printing region R11s. The object C5a is set to be arranged at a position of a center of the printing region R11s.

Figure 6:
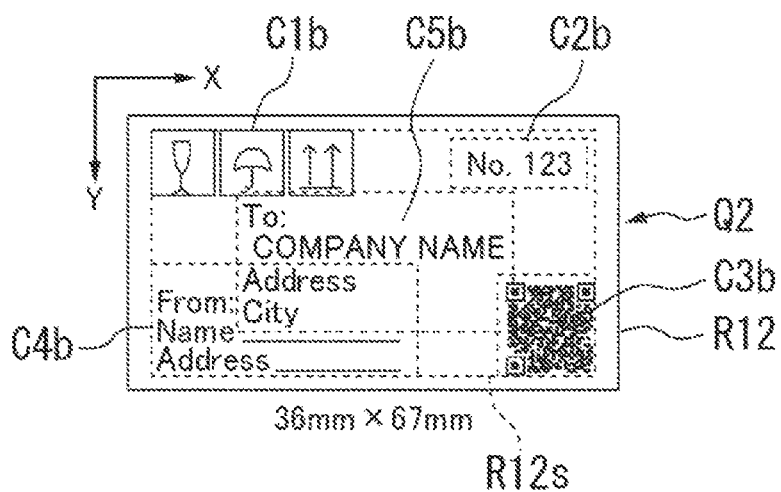
FIG. 6 is a diagram for illustrating one example of new label data in the at least one embodiment.

FIG. 6 is a diagram for illustrating one example of new label data Q2 in the at least one embodiment. The size of a sheet of the new label data Q2 differs from the size of the sheet of the existing label data P1, and is designated by the label print instruction. In the example of FIG. 6, the size of the new label data Q2 is 36 mm in length×67 mm in width.

A result of adjustment relating to the example of FIG. 6 is described. The new label data Q2 includes information for arranging five objects C1b to C5b at predetermined positions in a printing region R12s set inside a region of the sheet (sheet region R12). The objects C1b to C5b correspond to the objects C1 to C5 in the existing label data P1, respectively.

In the example of FIG. 6, the object C1*b* is set to be arranged at a position of an upper-left end of the printing region R12*s*. The object C2*b* is set to be arranged at a position separated by a predetermined distance from an upper-right end of the printing region R12*s*. The object C3*b* is set to be arranged at a position of a lower-right end of the printing region R12*s*. The object C4*b* is set to be arranged at a position of a lower-left end of the printing region R12*s*. The object C5*b* is set to be arranged at a position of a center of the printing region R12*s*.

Figure 7:
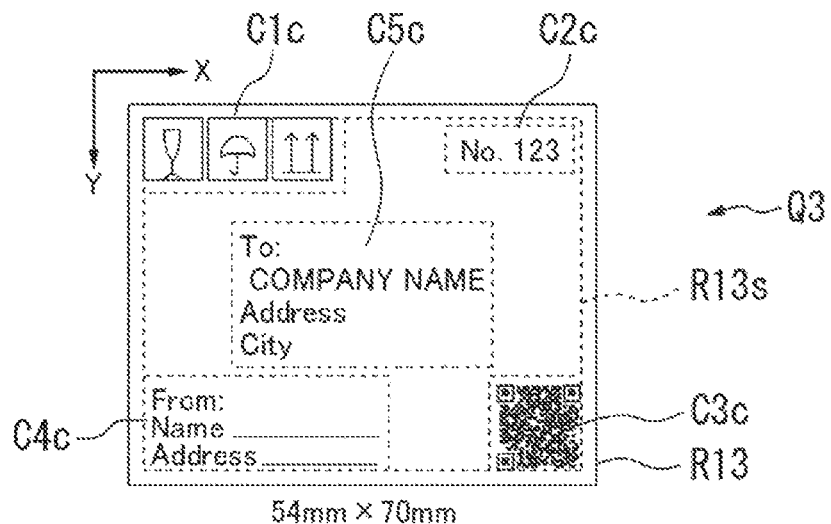
FIG. 7 is a diagram for illustrating one example of new label data in the at least one embodiment.

FIG. 7 is a diagram for illustrating one example of new label data Q3 in the at least one embodiment. The size of a sheet of the new label data Q3 differs from the size of the sheet of the existing label data P1, and is designated by the label print instruction. In the example of FIG. 7, the size of the new label data Q3 is 54 mm in length×70 mm in width.

A result of adjustment relating to the example of FIG. 7 is described. The new label data Q3 includes information for arranging five objects C1*c* to C5*c* at predetermined positions in a printing region R13*s* set inside a region of the sheet (sheet region R13). The objects C1*c* to C5*c* correspond to the objects C1 to C5 in the existing label data P1, respectively.

In the example of FIG. 7, the object C1*c* is set to be arranged at a position of an upper-left end of the printing region R13*s*. The object C2*c* is set to be arranged at a position separated by a predetermined distance from an upper-right end of the printing region R13*s*. The object C3*c* is set to be arranged at a position of a lower-right end of the printing region R13*s*. The object C4*c* is set to be arranged at a position of a lower-left end of the printing region R13*s*. The object C5*c* is set to be arranged at a position of a center of the printing region R13*s*.

Figure 8:
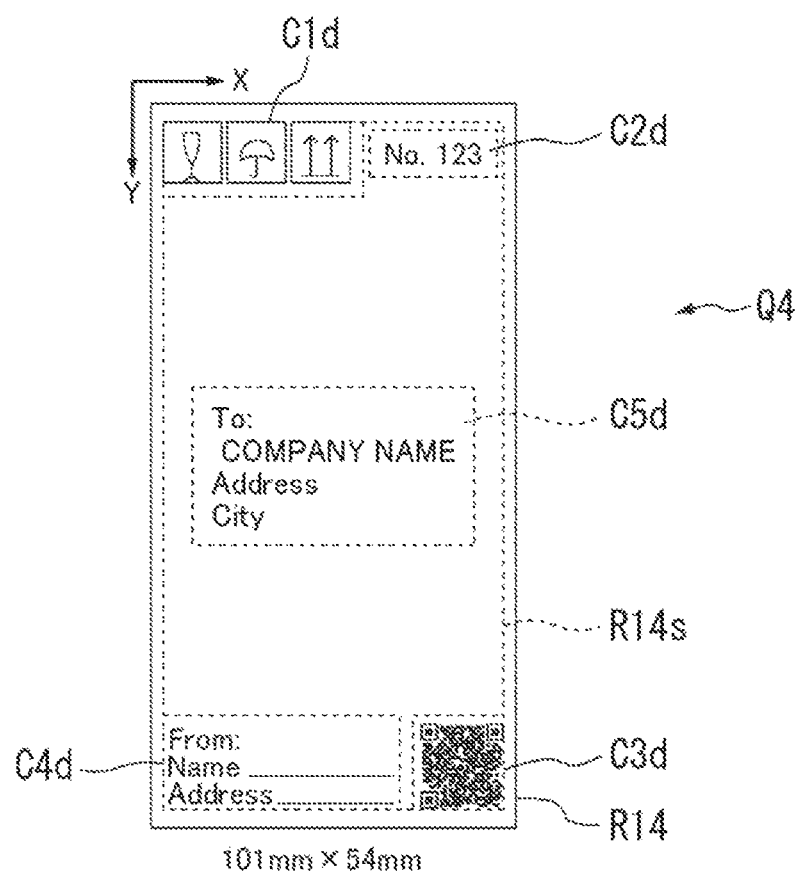
FIG. 8 is a diagram for illustrating one example of new label data in the at least one embodiment.

FIG. 8 is a diagram for illustrating one example of new label data Q4 in the at least one embodiment. The size of a sheet of the new label data Q4 differs from the size of the sheet of the existing label data P1, and is designated by the label print instruction. In the example of FIG. 8, the size of the new label data Q4 is 101 mm in length×54 mm in width.

A result of adjustment relating to the example of FIG. 8 is described. The new label data Q4 includes information for arranging five objects C1*d* to C5*d* at predetermined positions in a printing region R14*s* set inside a region of the sheet (sheet region R14). The objects C1*d* to C5*d* correspond to the objects C1 to C5 in the existing label data P1, respectively.

In the example of FIG. 8, the object C1*d* is set to be arranged at a position of an upper-left end of the printing region R14*s*. The object C2*d* is set to be arranged at a position separated by a predetermined distance from an upper-right end of the printing region R14*s*. The object C3*d* is set to be arranged at a position of a lower-right end of the printing region R14*s*. The object C4*d* is set to be arranged at a position of a lower-left end of the printing region R14*s*. The object C5*d* is set to be arranged at a position of a center of the printing region R14*s*.

As described in the examples of FIG. 4 to FIG. 8, in the host device 11, for example, based on one piece of existing label data, pieces of label data having a plurality of different sheet sizes can be generated through automatic layout. In the examples of FIG. 4 to FIG. 8, the case in which layout (position) of the object is adjusted while the size of the object is kept as it is has been described. In the examples of FIG. 4 to FIG. 8, the case in which overlapping of a plurality of objects is not taken into consideration has been described.

As a method of adjusting an arrangement position of an object, for example, a method that follows a rule such as "arranging the object in the upper left," "arranging the object in the lower left," "arranging the object in the upper right," "arranging the object in the lower right," "left-aligning the object in a horizontal direction," "right-aligning the object in the horizontal direction," "top-aligning the object in a vertical direction," "bottom-aligning the object in the vertical direction," "arranging the object at a center in the horizontal direction," "arranging the object at a center in the vertical direction," "arranging the object at a center in the vertical and horizontal directions," or "arranging the object at a predetermined separated position with respect to a predetermined position" may be used. A method of applying, for example, the same rule as the rule of the existing label data to the new label data as the above-mentioned rule may be used.

As the method of arranging the object at a predetermined separated position with respect to a predetermined position, for example, a method of making a ratio (%) of a separated position to an entire size (for example, a printing region) in existing label data the same as a ratio (%) of a separated position to an entire size (for example, a printing region) in new label data may be used.

As the method of adjusting an arrangement position of an object, for example, a method of adjusting coordinates (positional information) in new label data based on coordinates (positional information) in existing label data may be used.

Figure 9:
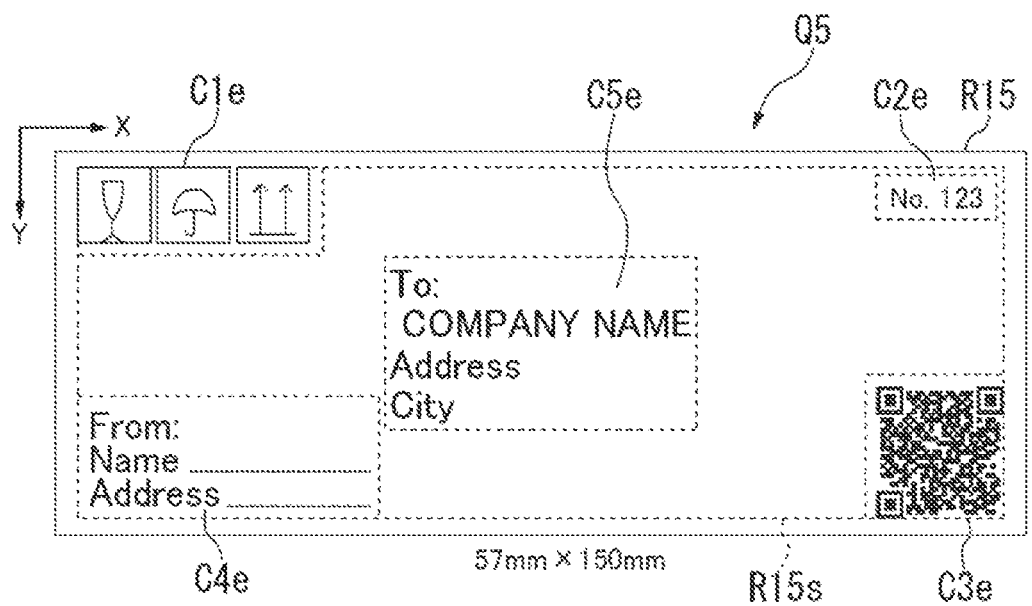
FIG. 9 is a diagram for illustrating one example of new label data in the at least one embodiment.

FIG. 9 is a diagram for illustrating one example of new label data Q5 in the at least one embodiment. The size of a sheet of the new label data Q5 differs from the size of the sheet of the existing label data P1, and is designated by the label print instruction. In the example of FIG. 9, the size of the new label data Q5 is 57 mm in length×150 mm in width.

A result of adjustment relating to the example of FIG. 9 is described. The new label data Q5 includes information for arranging five objects C1*e* to C5*e* at predetermined positions in a printing region R15*s* set inside a region of the sheet (sheet region R15). The objects C1*e* to C5*e* correspond to the objects C1 to C5 in the existing label data P1, respectively.

In the example of FIG. 9, the object C1*e* is set to be arranged at a position of an upper-left end of the printing region R15*s*. The object C2*e* is set to be arranged at a position separated by a predetermined distance from an upper-right end of the printing region R15*s*. The object C3*e* is set to be arranged at a position of a lower-right end of the printing region R15*s*. The object C4*e* is set to be arranged at a position of a lower-left end of the printing region R15*s*. The object C5*e* is set to be arranged at a position of a center of the printing region R15*s*.

As described in the examples of FIG. 4 and FIG. 9, in the host device 11, for example, when the new label data is to be generated based on the existing label data, the size of the object can be automatically adjusted so as to fit the size of the new label.

For example, in the host device 11, when a ratio of a label size in a lengthwise direction of the new label data to a label size in a lengthwise direction of the existing label data is equal to or larger than a predetermined value, the size of the object in the lengthwise direction may be adjusted. Further, for example, in the host device 11, when a ratio of a label size in a widthwise direction of the new label data to a label size in a widthwise direction of the existing label data is equal to or larger than a predetermined value, the size of the object in the widthwise direction may be adjusted. Still further, for example, in the host device 11, when a ratio of the area of a label of the new label data to the area of a label of the existing label data is equal to or larger than a predetermined value, the size of the object in one or both of the lengthwise direction and the widthwise direction may be adjusted.

When the sizes of one or more objects included in the label are to be adjusted, for example, the sizes of all of the objects may be changed at the same ratio, or the sizes of the objects may be changed at ratios that may be different from each other. As a method of changing the size of the object, for example, a method of changing the size while keeping an aspect ratio as it is may be used, or a method of changing the size while changing the aspect ratio may be used.

For example, a configuration in which the user is allowed to selectively designate whether to adjust the size of the object when the new label data is to be generated by the host device 11 may be used. Such designation may be included in, for example, the label print instruction.

<Another Example of Existing Label Data>

Figure 10:
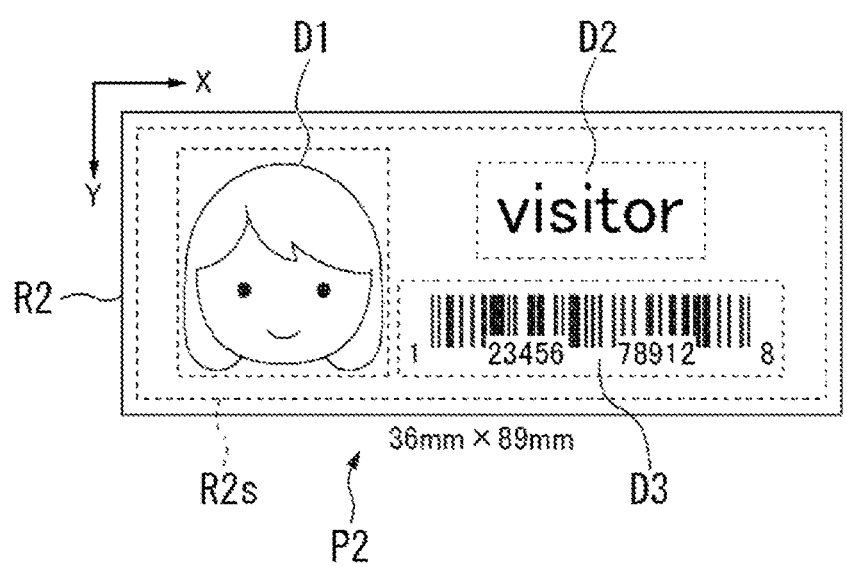
FIG. 10 is a diagram for illustrating one example of existing label data in the at least one embodiment.

FIG. 10 is a diagram for illustrating one example of existing label data P2 in the at least one embodiment. In the example of FIG. 10, the size of the existing label data P2 is 36 mm in length×89 mm in width. The existing label data P2 includes information for arranging three objects D1 to D3 at predetermined positions in a printing region R2s set inside a region of a sheet (sheet region R2).

In the example of FIG. 10, the object D1 is an object of a pictorial symbol (image), and is set to be arranged at the predetermined position of the printing region R2s. The object D2 is an object of characters, and is set to be arranged at the predetermined position of the printing region R2s. The object D3 is an object of a two-dimensional code, and is set to be arranged at the predetermined position of the printing region R2s.

In the at least one embodiment, each of the objects D1 to D3 is treated as an image.

<Overlapping Label Data>

Figure 11:
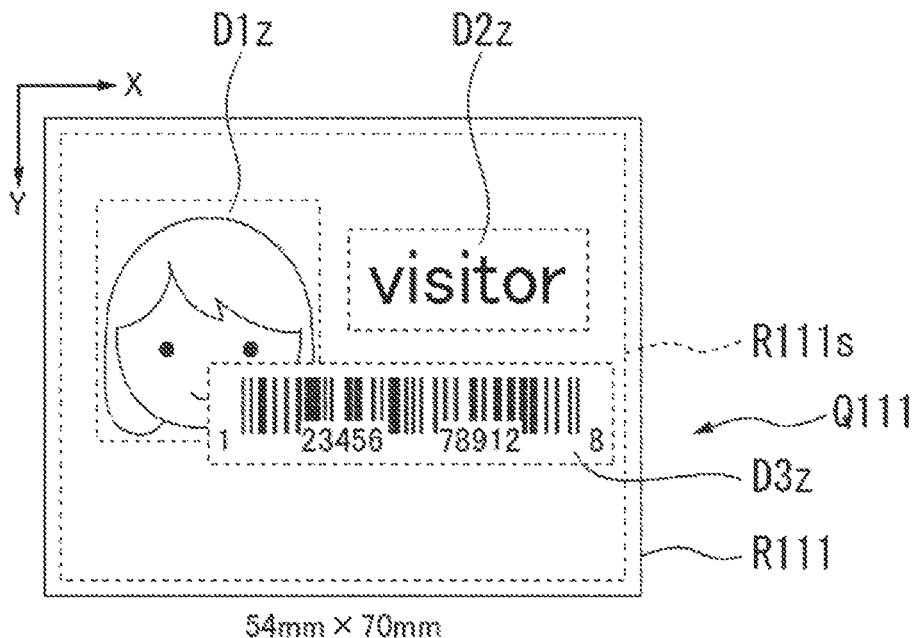
FIG. 11 is a diagram for illustrating one example of overlapping label data in the at least one embodiment.

FIG. 11 is a diagram for illustrating one example of overlapping label data Q111 in the at least one embodiment. The size of a sheet of the overlapping label data Q111 differs from the size of the sheet of the existing label data P2, and is designated by the label print instruction. In the example of FIG. 11, the size of the overlapping label data Q111 is 54 mm in length×70 mm in width.

A result of adjustment relating to the example of FIG. 11 is described. The overlapping label data Q111 includes information for arranging three objects D1z to D3z at predetermined positions in a printing region R111s set inside a region of the sheet (sheet region R111). The objects D1z to D3z correspond to the objects D1 to D3 in the existing label data P2, respectively.

In the example of FIG. 11, the object D1z is set to be arranged at the predetermined position of the printing region R111s. The predetermined position is, for example, a position obtained by changing, in accordance with a change in the ratio of the size of the sheet, the ratio in the upward, downward, leftward, or rightward direction relative to the predetermined position in the existing label data P2. The object D2z is set to be arranged at the predetermined position of the printing region R111s. The predetermined position is, for example, a position obtained by changing, in accordance with a change in the ratio of the size of the sheet, the ratio in the upward, downward, leftward, or rightward direction relative to the predetermined position in the existing label data P2. The object D3z is set to be arranged at the predetermined position of the printing region R111s. The predetermined position is, for example, a position obtained by changing, in accordance with a change in the ratio of the size of the sheet, the ratio in the upward, downward, leftward, or rightward direction relative to the predetermined position in the existing label data P2.

In the example of FIG. 11, the sizes of the objects D1z to D3z are the same as the sizes of the objects D1 to D3 in the existing label data P2, respectively. In the example of FIG. 11, the object D3z overlaps with the object D1z. Thus, in the at least one embodiment, the label generation module 116 performs adjustment so that those objects do not overlap with each other.

<Examples of New Label Data>

Figure 12:
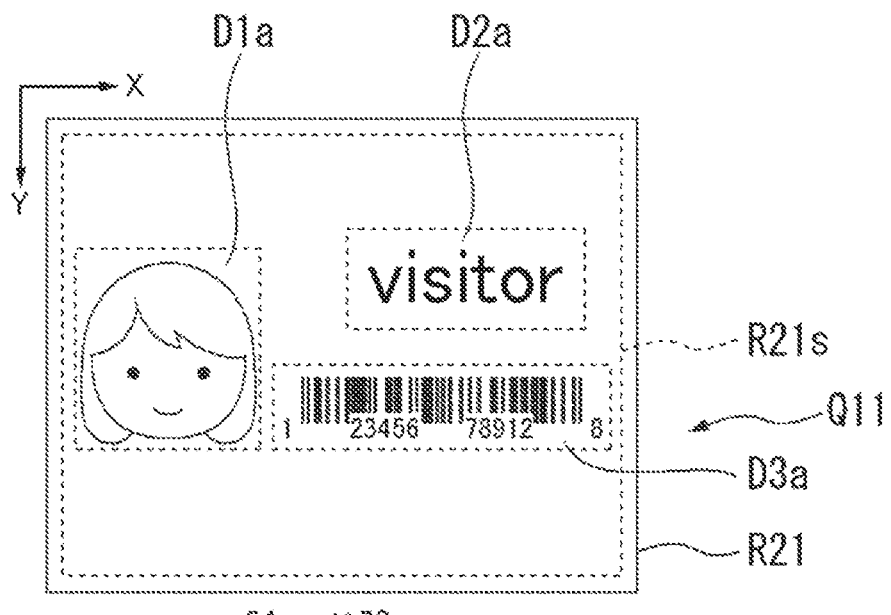
FIG. 12 is a diagram for illustrating one example of new label data in the at least one embodiment.
Figure 13:
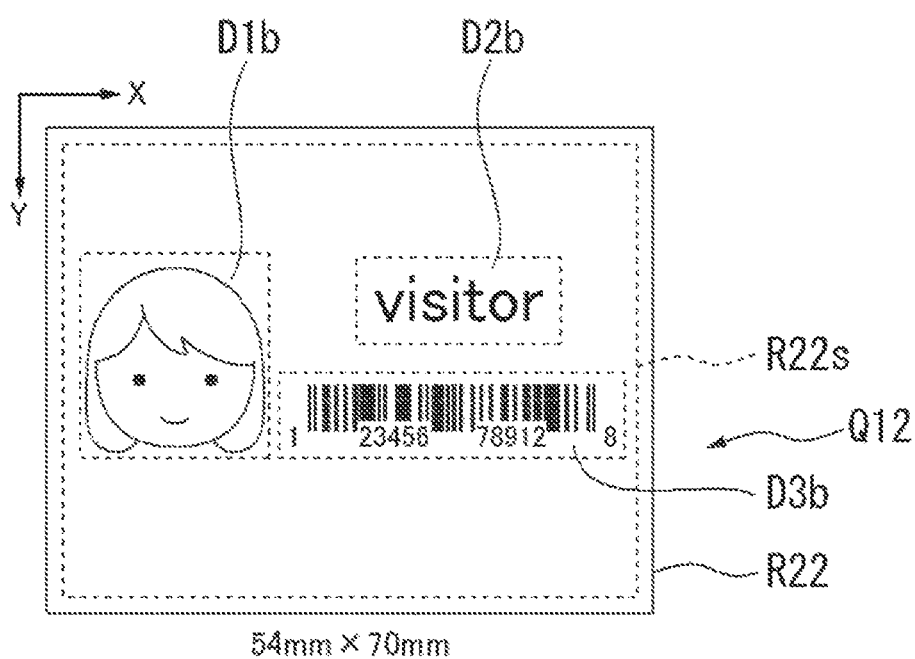
FIG. 13 is a diagram for illustrating one example of new label data in the at least one embodiment.

Referring to FIG. 12 and FIG. 13, examples of the new label data generated based on the existing label data P2 are described.

The label generation module 116 generates the new label data as a whole by adjusting, for each of the three objects D1 to D3 included in the existing label data P2, the position and the size thereof to arrange the object. In the adjustment processing, for each of the objects D1 to D3, one of the position and the size thereof may be changed, both thereof may be changed, or such a change in position or size may not be made.

FIG. 12 is a diagram for illustrating one example of new label data Q11 in the at least one embodiment. The size of a sheet of the new label data Q11 differs from the size of a sheet of the existing label data P2, and is designated by the label print instruction. In the example of FIG. 12, the size of the new label data Q11 is 54 mm in length×70 mm in width.

A result of adjustment relating to the example of FIG. 12 is described. The new label data Q11 includes information for arranging three objects D1a to D3a at predetermined positions in a printing region R21s set inside a region of the sheet (sheet region R21). The objects D1a to D3a correspond to the objects D1 to D3 in the existing label data P2, respectively.

In the example of FIG. 12, the object D1a is set to be arranged at the predetermined position of the printing region R21s. The predetermined position is, for example, a position obtained by changing, in accordance with a change in the ratio of the size of the sheet, the ratio in the upward, downward, leftward, or rightward direction relative to the predetermined position in the existing label data P2. The object D2a is set to be arranged at the predetermined position of the printing region R21s. The predetermined position is, for example, a position obtained by changing, in accordance with a change in the ratio of the size of the sheet, the ratio in the upward, downward, leftward, or rightward direction relative to the predetermined position in the existing label data P2. The object D3a is set to be arranged at the predetermined position of the printing region R21s. The predetermined position is, for example, a position obtained by changing, in accordance with a change in the ratio of the size of the sheet, the ratio in the upward, downward, leftward, or rightward direction relative to the predetermined position in the existing label data P2. In addition, the size of the object D3a is reduced to be smaller than the size thereof in the existing label data P2.

In the example of FIG. 12, only the object (in the example of FIG. 11, the object D3z) overlapping with another object in the example of FIG. 11 is resized (in the example of FIG. 12, the size thereof is reduced), to thereby eliminate overlapping of the objects. In the example of FIG. 12, the case in which the size of the object is adjusted has been described, but a mode in which the position of the object is adjusted in addition to the size of the object or in place of the size of the object may be used.

FIG. 13 is a diagram for illustrating one example of new label data Q12 in the at least one embodiment. The size of a sheet of the new label data Q12 differs from the size of the sheet of the existing label data P2, and is designated by the label print instruction. In the example of FIG. 13, the size of the new label data Q12 is 54 mm in length×70 mm in width.

A result of adjustment relating to the example of FIG. 13 is described. The new label data Q12 includes information for arranging three objects D1b to D3b at predetermined positions in a printing region R22s set inside a region of the sheet (sheet region R22). The objects D1b to D3b correspond to the objects D1 to D3 in the existing label data P2, respectively.

In the example of FIG. 13, the object D1b is set to be arranged at the predetermined position of the printing region R22s. The predetermined position is, for example, a position obtained by changing, in accordance with a change in the ratio of the size of the sheet, the ratio in the upward, downward, leftward, or rightward direction relative to the predetermined position in the existing label data P2. The object D2b is set to be arranged at the predetermined position of the printing region R22s. The predetermined position is, for example, a position obtained by changing, in accordance with a change in the ratio of the size of the sheet, the ratio in the upward, downward, leftward, or rightward direction relative to the predetermined position in the existing label data P2. In addition, the size of the object D2b is reduced to be smaller than the size thereof in the existing label data P2. The object D3b is set to be arranged at the predetermined position of the printing region R22s. The predetermined position is, for example, a position obtained by changing, in accordance with a change in the ratio of the size of the sheet, the ratio in the upward, downward, leftward, or rightward direction relative to the predetermined position in the existing label data P2. In addition, the size of the object D3b is reduced to be smaller than the size thereof in the existing label data P2.

In the example of FIG. 13, in addition to the object (in the example of FIG. 11, the object D3z) overlapping with another object in the example of FIG. 11, another object (in the example of FIG. 11, the object D2b) is resized (in the example of FIG. 13, the size thereof is reduced), to thereby eliminate overlapping of the objects. In the example of FIG. 13, the case in which the size of the object is adjusted has been described, but a mode in which the position of the object is adjusted in addition to the size of the object or in place of the size of the object may be used.

As described in the examples of FIG. 12 and FIG. 13, in the host device 11, for example, when the new label data is to be generated based on the existing label data, one or both of the position and the size of the object can be automatically adjusted in such a manner as to prevent two or more objects from overlapping with each other. As a method of adjusting at least one of the position or the size of the object, for example, a method of making the adjustment only for an object overlapping with another object may be used, or a method of making the adjustment for all of the objects included in the label may be used.

In the host device 11, for example, it can be determined whether or not two or more objects overlap with each other based on information on the position and the size of each object included in the label.

When the sizes of one or more objects included in the label are to be adjusted, for example, the sizes of all of the objects may be changed at the same ratio, or the sizes of the objects may be changed at ratios that may be different from each other.

For example, a configuration in which the user is allowed to selectively designate whether to make an adjustment in such a manner as to eliminate overlapping of the objects when the new label data is to be generated by the host device 11 may be used. Such designation may be included in, for example, the label print instruction. In the host device 11, when such a setting as not to execute processing of eliminating overlapping of the objects has been made by the user, for example, the overlapping label data Q111 illustrated in FIG. 11 may be generated as the new label data based on the existing label data P2 illustrated in FIG. 10.

In the host device 11, for example, a rule that the aspect ratio of characters be fixed may be used. In the host device 11, for example, a rule that the aspect ratio of a two-dimensional code be fixed may be used.

Figure 14:
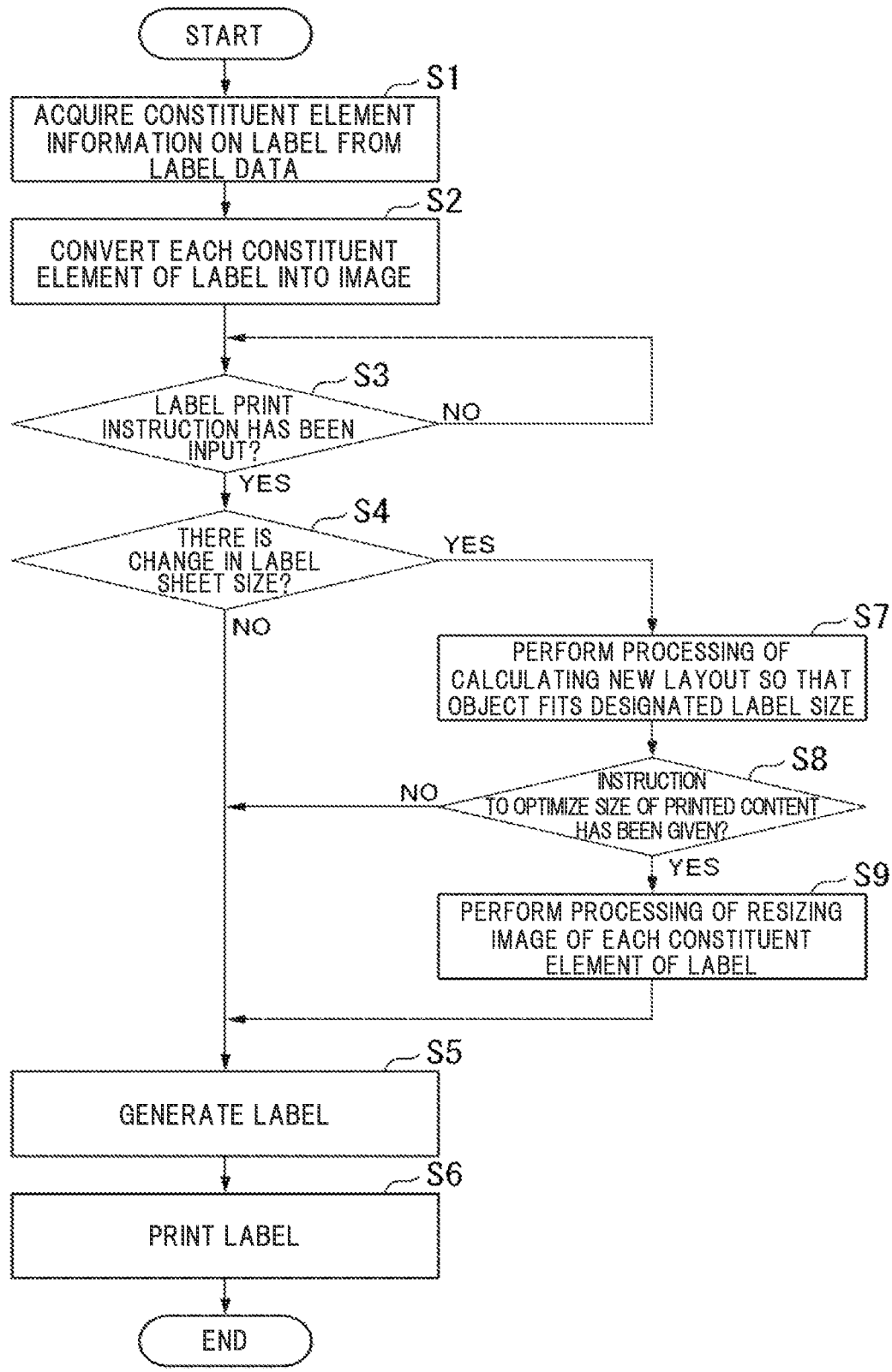
FIG. 14 is a flowchart for illustrating one example of a procedure of processing to be performed by the host device according to the at least one embodiment.

FIG. 14 is a flowchart for illustrating one example of a procedure of processing to be performed by the host device 11 according to the at least one embodiment.

(Step S1) In the host device 11, the analysis processing module 113 acquires constituent element information (object information) on a label from existing label data. Then, the process proceeds to Step S2.

(Step S2) In the host device 11, the image conversion module 114 converts each constituent element (object) of the label into an image. Then, the process proceeds to Step S3.

(Step S3) In the host device 11, the label generation module 116 determines whether or not a label print instruction given by the instruction processing module 111 has been input. When the label generation module 116 determines as a result of the determination that the label print instruction given by the instruction processing module 111 has been input (YES in Step S3), the process proceeds to Step S4. In contrast, when the label generation module 116 determines as a result of the determination that no label print instruction given by the instruction processing module 111 has been input (NO in Step S3), the label generation module 116 repeatedly performs the processing step of Step S3.

(Step S4) In the host device 11, the label generation module 116 determines, based on the label print instruction given by the instruction processing module 111, whether or not there is a change in label sheet size. When the label generation module 116 determines as a result of the determination that there is a change in label sheet size (YES in Step S4), the process proceeds to Step S7. In contrast, when the label generation module 116 determines as a result of the determination that there is no change in label sheet size (NO in Step S4), the process proceeds to Step S5.

When the process proceeds from Step S4 to Step S5, the size of the sheet of the existing label data and the size of the sheet of new label data are the same, and hence the label generation module 116 generates, for example, the same label data as the existing label data as the new label data.

(Step S5) In the host device 11, the label generation module 116 generates label data. Then, the process proceeds to Step S6.

(Step S6) In the host device 11, the printing module 117 prints the generated label data. Then, the processing of this flow ends.

(Step S7) In the host device 11, the label generation module 116 performs processing of calculating new layout (for example, position) of each object so that the object fits a designated label size (the size of the sheet of the new label data). Then, the process proceeds to Step S8.

(Step S8) In the host device 11, the label generation module 116 determines whether or not an instruction to optimize the size of printed content has been given. When the label generation module 116 determines as a result of the determination that the instruction to optimize the size of printed content has been given (YES in Step S8), the process proceeds to Step S9. In contrast, when the label generation module 116 determines as a result of the determination that no instruction to optimize the size of printed content has been given (NO in Step S8), the process proceeds to Step S5.

In the example of this flow, the user is allowed to set whether to give the instruction to optimize the size of printed content. The instruction to optimize the size of printed content may be included in, for example, the label print instruction, or may be set in the host device 11.

(Step S9) In the host device 11, the label generation module 116 performs processing of resizing the image of each constituent element (object) of the label. Then, the process proceeds to Step S5.

The processing step of Step S1 and the processing step of Step S2 may be performed in advance (at a discontinuous timing) before, for example, the processing steps of Step S3 and the subsequent steps are performed, or when the processing steps of Step S3 and the subsequent steps are to be performed, the series of processing steps illustrated in FIG. 14 may be performed (at a continuous timing) from the processing step of Step S1.

As described above, in the printing system 1 according to the at least one embodiment, when the host device 11 controls label printing performed by the thermal printer 12, the host device 11 generates the new label by adjusting one or both of the position and the size of the object in a new label based on the information relating to the object included in the existing label data and the size of the new label. Accordingly, in the printing system 1 according to the at least one embodiment, when the new label data is to be generated in the host device 11 based on the existing label data, the arrangement position of the object can be adjusted without an increase in workload on the user.

Thus, in the host device 11 according to the at least one embodiment, when the size in at least one of the lengthwise direction or the widthwise direction differs between the existing label and the new label, one or both of print layout (print position) and a print size can be automatically adjusted (for example, adjusted so as to be optimal) in changing the label size.

In the at least one embodiment, for example, an overall appearance in the new label can be made the same as (or similar to) that in the existing label. As an example, the overall appearances can be made the same as (or similar to) each other by making relative positions of two or more objects in the new label the same as (or similar to) relative positions of two or more objects in the existing label. Thus, in the host device 11, the relative positions of the two or more objects in the new label can be adjusted based on the relative positions of the two or more objects included in the existing label data.

In the host device 11 according to the at least one embodiment, information on the object forming the label is extracted from the existing label data automatically by a program, and the new label data is generated based on the information.

In the host device 11, for example, based on the positional information on the object that has been extracted, it is possible to calculate the relative position of the object within the printing region (print region), and based on a result of the calculation, calculate new layout (position) to arrange the object so that the object fits the designated new label sheet. Thus, in the host device 11, constituent elements of the existing label can be automatically laid out again so that the constituent elements fit the sheet that has been newly designated.

In the host device 11, for example, based on the size information on the printing region (print region) and each object that has been extracted, it is possible to calculate an optimal print size within the printing region of the designated new label sheet to arrange the object. Thus, in the host device 11, constituent elements of the existing label can be automatically resized so that the constituent elements fit the sheet that has been newly designated.

In the host device 11, for example, based on the positional information and the size information on each object that have been extracted, it is possible to calculate a position at which the objects do not overlap with each other in the printing region of the new label sheet, and resize the object to arrange the resultant object. Thus, in the host device 11, when the new label is to be generated from the existing label, and the object contained in the label partially overlaps with another object, it is possible to automatically adjust the position or size of the object overlapping with another object to prevent two or more objects from overlapping with each other. In this case, in the host device 11, for example, only the object overlapping with another object may be adjusted in terms of its arrangement position, or all of the objects may be adjusted in terms of their arrangement positions.

In the host device 11, for example, based on a ratio between predetermined values (for example, the label size in the lengthwise direction, the label size in the widthwise direction, or the area) regarding the size of the label of the existing label data and the size of the new label, the sizes of one or more objects in the new label can be adjusted.

In the host device 11, for example, when the object is a two-dimensional code, the aspect ratio of the object in the existing label data and the aspect ratio of the object in the new label can be made the same. With this configuration, for example, it is possible to enable the two-dimensional code to be easily read even in the new label.

In the host device 11 according to the at least one embodiment, for example, even when the user does not use a dedicated label creation tool, it is possible to extract content of the label (for example, a character, an image, a one-dimensional code, or a two-dimensional code) from the existing label data to generate the new label. Thus, in the at least one embodiment, the user is not required to operate a dedicated label creation tool, and it is possible to make effective use of the existing label data and automatically fit the arrangement position of the object in the new label to sheets of a plurality of sizes. With this configuration, in the at least one embodiment, it is possible to make effective use of the existing label data, and automatically optimize the position and the size of the object so that the object fits the sheet designated by the user or the like.

The printing system 1 according to the at least one embodiment relates to printing control of a label issuing device (for example, the thermal printer 12) which performs printing through use of the thermal head. In the label issuing device, for example, a ticket may be issued. A compact and simple configuration is demanded of the label issuing device of this type. For this reason, such a label issuing device is a copying machine, a multi-function printer, or a home-use printer, and hence there is no room for mounting a circuit component and the like for implementing complex printing control. Further, a target of printing is, for example, heat-sensitive labels having a sheet width of from two inches to three inches that are arranged at equal intervals on a roll-shaped liner, or linerless labels obtained by directly winding heat-sensitive labels each having a surface to which a peeling layer is applied, but the length (the length in a winding direction) and the sheet width of each heat-sensitive label vary depending on a label type and user requirements, and hence a function of appropriately adjusting a printing mode in accordance with such variation is required. In view of this, in the at least one embodiment, such problems can be solved.

In the at least one embodiment, the case in which the host device 11 uses content (excluding the position and the size here) of the object included in the existing label data as it is in the new label data has been described, but as another example, content of the object included in the existing label data may be replaced with other content to generate the new label data. With this configuration, in the host device 11 according to the at least one embodiment, for example, even when the user does not use a dedicated label creation tool, content (for example, a character, an image, a one-dimensional code, or a two-dimensional code) of the object included in the existing label data can be replaced with other content to generate the new label data. As a specific example, the characters of "No. 123" can be replaced with the characters of "No. 456." An instruction to perform such replacement may be included in, for example, the label print instruction.

A program for implementing the function of any component of any device described above may be recorded in a computer-readable recording medium so that the program is read by a computer system to be executed. The "computer system" here includes an operating system or hardware including peripheral devices. Further, the "computer-readable recording medium" is a portable medium such as a flexible disk, a magneto-optical disk, a ROM, or a compact disc read-only memory (CD-ROM), or a storage device built in the computer system, such as a hard disk drive. The term "computer-readable recording medium" also includes a medium which holds a program for a fixed period of time, for example, a volatile memory included in a computer system serving as a server or a client in a case in which a program is transmitted via a network such as the Internet, or a communication line such as a telephone line. The volatile memory may be, for example, a random access memory (RAM). The recording medium may be, for example, a non-transitory recording medium.

The above-mentioned program may be transmitted from the computer system in which the program is stored in, for example, the storage device, to another computer system via a transmission medium or through a transmission wave in a transmission medium. The "transmission medium" here through which a program is transmitted refers to a medium having a function of transmitting information, for example, a network such as the Internet or a communication line such as a telephone line. Further, the above-mentioned program may be intended to implement some of the functions described above. Further, the above-mentioned program may be a program which enables the functions described above to be implemented when being combined with a program that is already recorded in the computer system, which is what is called "differential file." The differential file may also be referred to as "differential program."

The function of any component of any device described above may be implemented by a processor. For example, each procedure of processing in the at least one embodiment may be implemented by a processor which operates based on information such as a program and a computer-readable recording medium having stored thereon the information such as a program. For example, functions of respective parts of the processor may be implemented by individual pieces of hardware, or the functions of the respective parts may be implemented by integrated hardware. For example, the processor includes hardware, and the hardware may include at least one of a circuit which processes a digital signal or a circuit which processes an analog signal. For example, the processor may be formed through use of one or both of one or a plurality of circuit devices mounted on a circuit board, and one or a plurality of circuit elements mounted thereon. An integrated circuit (IC) or the like may be used as the circuit device(s), and a resistor, a capacitor, or the like may be used as the circuit element(s).

The processor may be, for example, a CPU. It should be noted, however, that the processor is not limited to a CPU, and for example, one of various types of processors such as a graphics processing unit (GPU) and a digital signal processor (DSP) may be used as the processor. The processor may also be, for example, a hardware circuit implemented by an application-specific integrated circuit (ASIC). The processor may be formed of, for example, a plurality of CPUs, or may be formed of a hardware circuit implemented by a plurality of ASICs. The processor may also be formed of, for example, a combination of a plurality of CPUs and a hardware circuit implemented by a plurality of ASICs. The processor may also include, for example, one or more of an amplifier circuit which processes an analog signal, a filter circuit, and the like.

In the above, the at least one embodiment of the present disclosure has been described in detail with reference to the drawings, but specific configurations are not limited to those of the at least one embodiment and encompass a change in design and the like without departing from the gist of the present disclosure.

What is claimed is:

1. A printing system, comprising:
   a portable terminal including a thermal head; and
   a host device connected to the portable terminal and configured to control label printing performed by the portable terminal,
   wherein the host device is configured to generate a new label by adjusting, based on information relating to a plurality of objects included in existing label data and a size of the new label, one or both of positions and sizes of the plurality of objects in the new label,
   the existing label data is applied to an existing label having a length and width different than a length and width of the new label,
   the information relating to the plurality of objects comprises position information of the plurality of objects in the existing label data,
   the existing label and the new label comprise a same number of objects, and
   relative positions of the objects in the new label are identical with or similar to relative positions of the objects in the existing label.

2. The printing system according to claim 1, wherein the host device is further configured to extract the information on the objects included in the existing label data.

3. The printing system according to claim 1 or 2,
   wherein the host device is further configured to convert the information on each of the plurality of objects into an image, and generate the new label through use of the image obtained by the conversion.

4. The printing system according to claim 1 or 2, wherein the host device is further configured to receive input of an instruction including the size of the new label.

5. The printing system according to claim 1 or 2, wherein the host device is configured to adjust, based on a ratio between predetermined values regarding a size of a label of the existing label data and the size of the new label, sizes of one or more objects in the new label.

6. The printing system according to claim 1 or 2, wherein the host device is configured to generate the new label in which two or more objects are prevented from overlapping with each other by adjusting one or both of a position and a size of each of one or more objects in the new label.

7. The printing system according to claim 6, wherein the host device is configured to adjust one or both of a position and a size of each of one or more objects among two or more objects overlapping with each other, to thereby prevent the two or more objects from overlapping with each other.

8. The printing system according to claim 6, wherein the host device is configured to adjust one or both of a position and a size for each of all objects in the new label.

9. The printing system according to claim 1 or 2, wherein the host device is configured to make, when one of the objects is a two-dimensional code, an aspect ratio of the object in the existing label data and an aspect ratio of the object in the new label the same.

10. A host device for controlling label printing performed by a portable terminal including a thermal head, the host device being connected to the portable terminal and configured to generate a new label by adjusting, based on information relating to a plurality of objects included in existing label data and a size of the new label, one or both of positions and sizes of the plurality of objects in the new label,
the existing label data being applied to an existing label having a length and width different than a length and width of the new label,
the information relating to the plurality of objects comprising position information of the plurality of objects in the existing label data,
the existing label and the new label comprising a same number of objects, and
relative positions of the objects in the new label being identical with or similar to relative positions of the objects in the existing label.

11. A printing control method of controlling label printing performed by a portable terminal including a thermal head, the printing control method comprising generating a new label by adjusting, based on information relating to a plurality of objects included in existing label data and a size of the new label, one or both of positions and sizes of the plurality of objects in the new label,
the existing label data being applied to an existing label having a size different than the size of the new label,
the information relating to the plurality of objects comprising position information of the plurality of objects in the existing label data,
the existing label and the new label comprising a same number of objects, and
relative positions of the objects in the new label being identical with or similar to relative positions of the objects in the existing label.

12. A non-transitory machine-readable media, having instructions stored on the machine-readable media, the instructions configured to, when executed, cause a machine to:
acquire information relating to a plurality of objects included in existing label data;
acquire a size of a new label; and
generate the new label by adjusting, based on the acquired information relating to the plurality of objects and the acquired size of the new label, one or both of positions and sizes of the plurality of objects in the new label,
the existing label data being applied to an existing label having a size different than the size of the new label,
the information relating to the plurality of objects comprising position information of the plurality of objects in the existing label data,
the existing label and the new label comprising a same number of objects, and
relative positions of the objects in the new label being identical with or similar to relative positions of the objects in the existing label.

* * * * *